Sept. 1, 1964  G. A. ROSS ETAL  3,147,364
CONSTANT-TEMPERATURE BATH
Filed Aug. 30, 1962  2 Sheets-Sheet 2
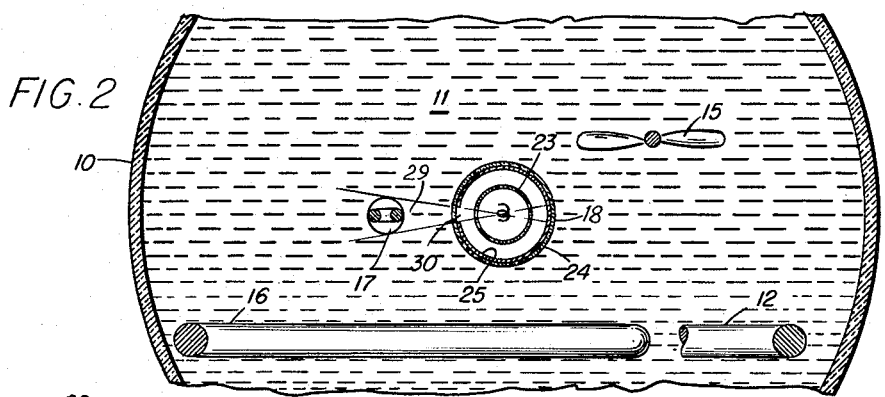
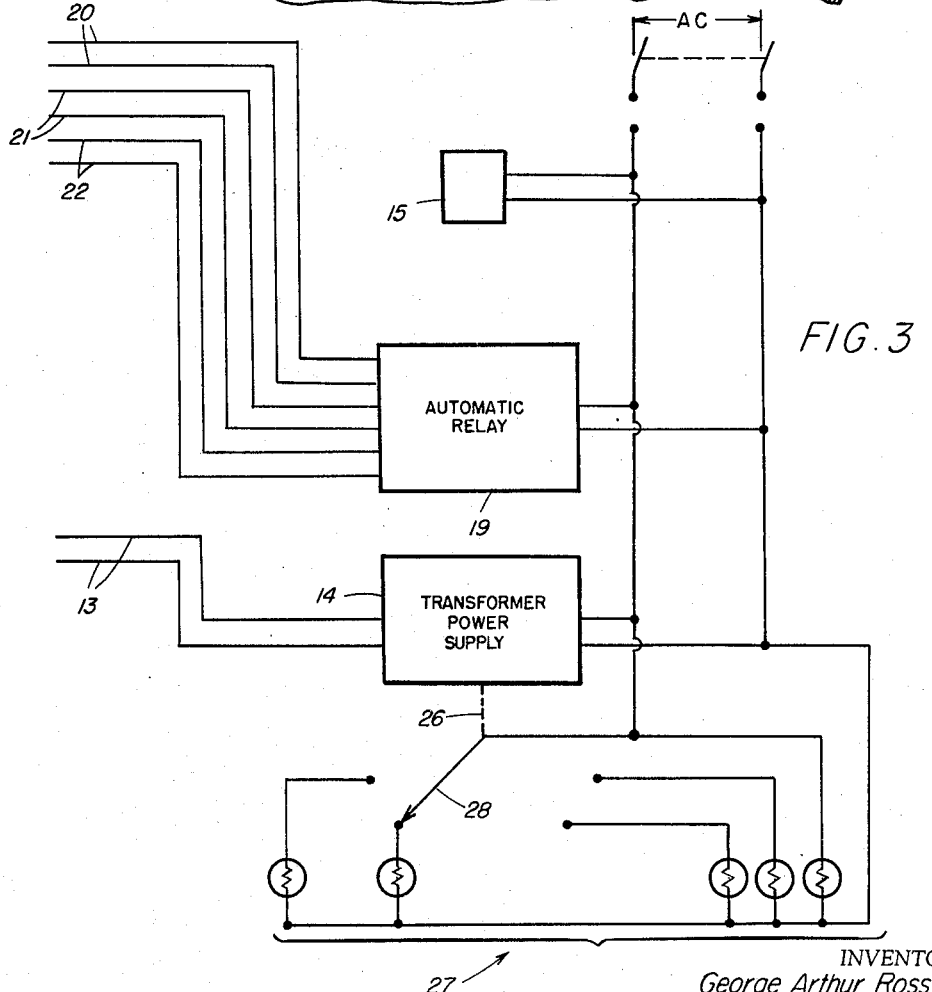
INVENTORS
George Arthur Ross
George William Worrell
By Charles A. Huggett
Attorney

United States Patent Office 3,147,364
Patented Sept. 1, 1964

3,147,364
CONSTANT-TEMPERATURE BATH
George Arthur Ross, Basildon, and George William Worrell, Billericay, England, assignors, by mesne assignments, to Socony Mobil Oil Company, Inc., New York, N.Y., a corporation of New York
Filed Aug. 30, 1962, Ser. No. 220,510
3 Claims. (Cl. 219—331)

This invention relates to a method and means of maintaining a substantially constant temperature in a defined body of liquid, such as a constant temperature bath for making physical measurements, and more particularly to the minimization of cycling in the control of the temperature.

It is frequently important to provide a means for maintaining an operation at a constant temperature for a length of time, or for maintaining the operation at different temperature levels at different periods of time. For example, the viscosity of a mineral oil is determined by measuring the length of time it takes a known amount of the liquid to pass through an aperture of known diameter. The tests are usually conducted at 70°, 100°, 130°, 140°, 200°, and 210° F. by immersing the test apparatus containing the sample into a constant temperature bath of water, glycol, oil, paraffin or other suitable liquids depending on the desired temperature. Presently available methods for maintaining the temperature of these baths constant comprise a temperature responsive device (such as a thermocouple) immersed in the bath liquid, bath heater arranged and adapted to warm the bath to the desired temperature, and control means for the heating device operably connected to the thermocouple to deactivate the heating device when the thermocouple signal indicates the bath medium is at the desired temperature, or to reactivate the heating device when the thermocouple indicates that the temperature had dropped a definite amount below the desired temperature.

The presently available devices tend to overshoot the desired temperature on the heating portion of the cycle which results in a condition know to the art as hunting. This is an excessive variation above and below the desired temperature due to an inherent response lag in the control device: the temperature generally will continue to rise somewhat even after the heater has been deactivated by the control means.

A further disadvantage of presently available equipment is the lack of flexibility in their operation. Most of them are designed for operation at a single temperature, or perhaps within a narrow range of temperatures, so that it would be necessary to use a different bath to measure the viscosity, for example, at each of the six temperatures listed above.

It is therefore an object of this invention to provide apparatus for maintaining a substantially constant temperature within a defined body of liquid. It is a further object of this invention to minimize cycling of the temperature within the body of liquid.

Another object of the invention is to provide a constant temperature bath suitable for use over a wide range of temperatures.

Still another object of this invention is to provide a means for accurately maintaining a constant temperature bath for a wide range of temperatures.

It is also an object of this invention to provide a method for accurately maintaining a defined body of fluid within a narrow temperature range.

Generally this invention comprises a regulable heating means for raising the temperature of a defined body of fluid, a temperature sensing element, immersed in the body of fluid, for sending a signal which is a function of its own temperature, control means for said regulable heating means responsive to the signal from the temperature sensitive means, and radiant heating means arranged and adapted to warm the temperature sensing element, during the period that the bath temperature is being raised, above the level of the bulk of the fluid by having means to direct its radiation primarily onto the temperature sensing element. The sensing element is kept at a slightly higher temperature than that surrounding medium during the period that the bath is being warmed to the desired temperature, to compensate for the response lag and forestall the temperature rise above the required value. The amplitude of the hunting cycle is thus decreased.

It is preferred that the conduction heating means comprise one of more primary electric immersion elements regulated by a voltage varying device such as a transformer or a rheostat, and at least one secondary electric immersion element, preferably having a lower rating than the primary heater, controlled by an automatic relay responsive to the signal from the temperature sensitive element. The radiant heater is preferably controlled by the same relay as is the secondary conduction heater.

The primary conduction heater should be set so as to deliver sufficient heat to keep the bath at a temperature of about 20 F. below the desired value. The heat necessary to warm the bath the remaining 20° F. is supplied by the secondary heater.

The temperature sensitive element is preferably some form of adjustable contact thermometer. For extremely accurate work, short range types should be used and a different thermometer placed in the circuit for making determinations over a broad range of temperatures.

Alternatively, it would be possible to operate with only a single heater that is operated by the control means. This would not be as effective, as using the two heaters, especially at temperatures much above ambient, because of the rapid decrease in temperature which would result in an increase in the frequency of the cycling. Using at least two separate heaters, one of which is activated at all times, results in a longer cooling-off period which will decrease the frequency in the cycling. This also tends to decrease the amplitude of the cycles. It is however within the scope of this invention to use a single heater, or battery of heaters, if the automatic relay was arranged to reduce the power to the heater rather than to completely de-activate it.

Similarly, although it is preferred to have the radiant heater immersed in the bath, it is within the scope of this invention to have the temperature indicator located near a transparent wall of the container holding the bath and have a radiant heat source located just on the other side of the wall.

Operation of the invention will be explained in connection with the specific embodiment described below and shown in the accompanying drawings.

FIGURE 2 is a horizontal cross section on line 2—2 of FIGURE 1.

FIGURE 3 is a circuit diagram of the same embodiment.

Figure 1:
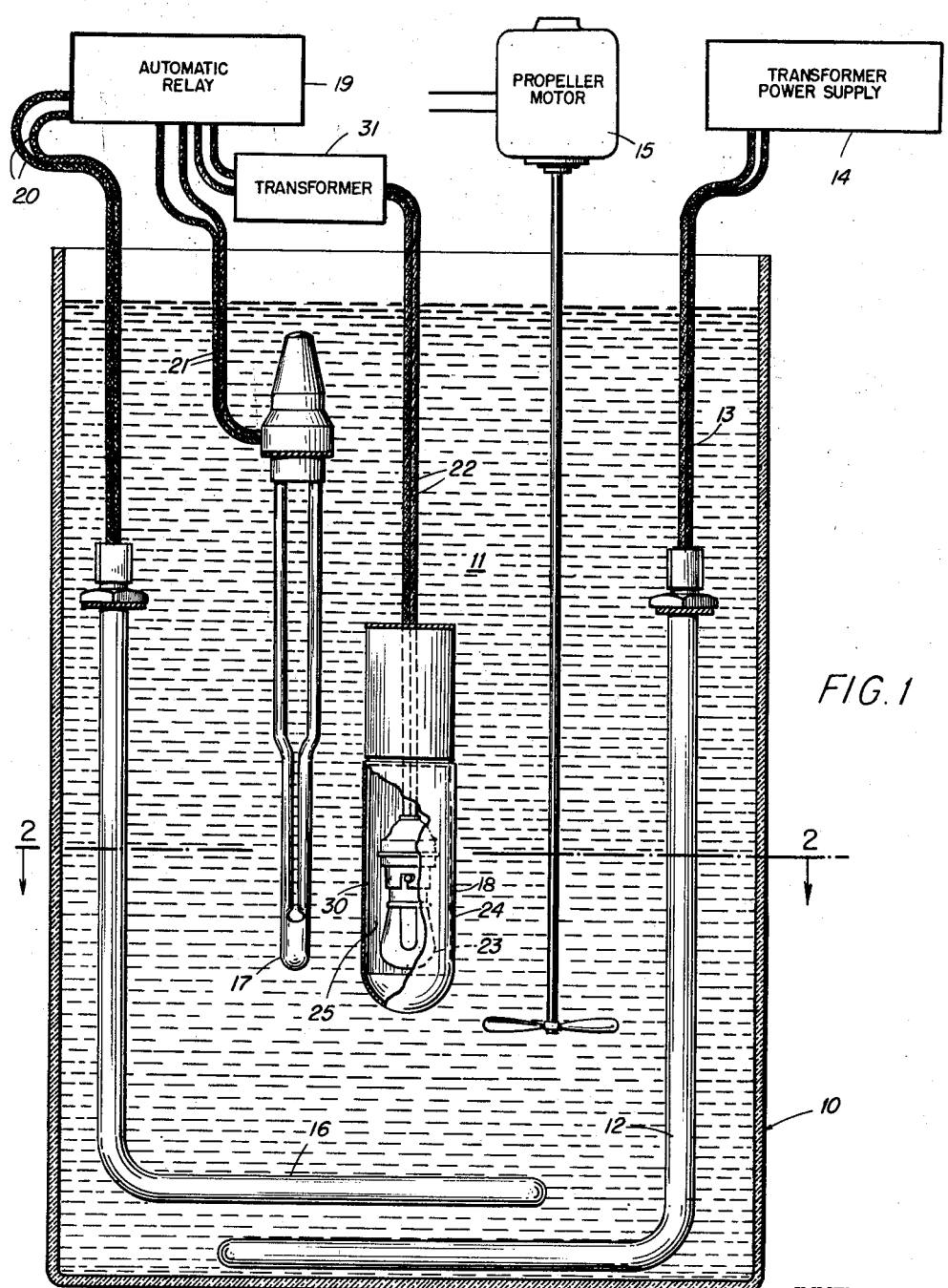
FIGURE 1 is a longitudinal view of a constant temperature bath embodying this invention.

Referring to FIGURE 1, container 10 holds bath liquid, such as water 11. Immersed in the liquid 11 is a primary 1000 watt electric immersion heater 12 connected by leads 13 to transformer power supply 14 and propeller mixer 15 connected to a power source not shown. Similarly immersed in the liquid 11 are the secondary 250 watt electric immersion heater 16, a temperature indicator, such as a thermocouple or contact thermometer 17 and radiant heater 18 which are connected (as detailed in FIGURE 3 below) to automatic relay 19 (such as an electronic type Sunvic EA$_4$) by leads 20, 21, and 22 respectively. Transformer 31 may be utilized to regulate the intensity of the radiant heater 18. As shown, the radiant heater 18 comprises a 25 watt incandescent electric bulb 23 encased in a liquid tight glass tube 24 containing a foil reflector 25 having a longitudinal slit 30 facing the contact thermometer 17. As shown in FIGURE 2, reflector 25 is so arranged that almost all of the radiation (light beam 29) from bulb 23 is directed onto contact thermometer 17 which should be about 1½ inches from the lamp 23 (for this particular apparatus.) The bulb 23 is separated from the glass tube 24 and the intermediate reflector 25 by an air space as to minimize heating the bath by conduction.

Referring now to FIGURE 3, mixer-motor 15, relay 19 and variable transformer 14 are connected in parallel to the A.C. source. Leads 20, 21, and 22 are connected to relay 19 and leads 13 are connected to transformer 14. In the embodiment shown, the transformer 14 is a step-variable type, operated by selection spindle 26. The setting of the transformer 14 may be indicated by means such as the light circuit 27 operated by electrical contact 28 attached to spindle 26.

In operation, the heaters and mixer 15 are turned on full until the bath liquid 11 has reached the desired temperature, for example 140° F. Relay 19 then shuts off the secondary heater 16 and radiation heater 18 and the operator sets transformer 14 to deliver just enough power to the primary heater 12 to keep the bath liquid 11 at 120° F., or 20° F. below the desired temperature. The transformer setting for any desired temperature for the given size bath may be predetermined experimentally.

When the temperature drops below the desired value, contact thermometer 17 actuates relay 19 to re-activate radiant heater 18 and secondary heater 16. The temperature of the whole bath begins to rise but the contact thermometer 17 is warmed a little more quickly because of the radiation from the bulb 23 and the contact thermometer 17 reaches the desired temperature before the bath liquid. When the contact thermometer 17 does reach the desired temperature the relay de-activates the two heaters 16 and 18 so that the heater response lag will just be enough to allow the bath to reach the desired temperature.

The bulb 23 is adjusted to the proper intensity so as to have the temperature of the contact thermometer 17 the proper amount above that of the bath so that it will actuate the relay at the proper time. If the radiant heater was to be too powerful, the secondary heater may be de-activated too soon and the bath will not be warmed sufficiently. The proper setting for transformer 31 may be determined experimentally.

By thus anticipating the general rise in temperature of the bath during heating, the lag is compensated for, so that the amplitude of the temperature cycle of the bath is kept at a minimum.

What is claimed is:

1. Apparatus for maintaining the temperature of a bath, comprising a temperature-responsive element adapted to be immersed in a bath and to generate a signal which is a function of its own temperature, heating means to supply heat to the bath, control means responsive to the signal from said temperature-responsive element to increase the rate at which heat is supplied to said bath by said heating means when the signal indicates said element has cooled below a first predetermined temperature and to decrease the rate at which heat is supplied to said bath by said heating means when the signal indicates said element has been heated to a second predetermined temperature, a radiant energy source adapted to be immersed in said bath and responsive to the signal from said temperature-responsive element to heat said element a substantially fixed temperature differential above the surrounding bath medium after the rate at which heat is being supplied by said heating means is increased and before said rate is decreased, whereby the rate at which heat is supplied by the heating means is decreased before the bath medium reaches said second predetermined temperature, liquid-tight means surrounding said radiant energy source and spaced therefrom by a confined space to thermally insulate said radiant energy source from conductive heat transfer with said bath, said liquid-tight means being transparent in at least a portion thereof that faces said temperature-responsive element, and reflector means surrounding said radiant energy source and positioned between said radiant energy source and said liquid-tight means and adapted to focus a major portion of the radiation from said source through a transparent portion of said liquid-tight means onto said temperature-responsive element.

2. Apparatus for maintaining the temperature of a bath, comprising a primary electric immersion heater for providing the major portion of the heat necessary to keep said bath at the desired temperature, a secondary electric immersion heater for providing the minor portion of the heat necessary to keep said bath at the desired temperature, a contact thermometer adapted to be immersed in said bath and to generate a signal representative of its temperature, a radiant heater adapted to be immersed in said bath comprising a liquid-tight tube which is transparent in at least a portion thereof that faces said contact thermometer, an incandescent bulb inside said tube and separated therefrom by an air space to thermally insulate said bulb from conductive heat transfer with said bath, a foil reflector intermediate said bulb and said tube and surrounding said bulb, said reflector having an elongated opening facing said contact thermometer to focus a major portion of the radiation from said bulb through a transparent portion of said tube and onto said contact thermometer, and an automatic relay in electrical connection with said contact thermometer, said secondary heater and said radiant heater, said relay being adapted to operate said secondary heater and said radiant heater in response to the signal from said contact thermometer, said secondary heater and said radiant heater being deactivated when the signal from said contact thermometer indicates a temperature at least as great as the desired temperature and reactivated when the signal from said contact thermometer indicates a temperature lower than the desired temperature, whereby said contact thermometer is heated to the desired temperature sooner than the bath so that said secondary heater is deactivated in time to minimize heating the bath to above the desired temperature.

3. Apparatus, as defined in claim 2, further comprising an electric transformer for regulating the voltage to said primary heater and mixing means to provide a uniform temperature throughout the bath.

References Cited in the file of this patent

UNITED STATES PATENTS

| | | |
|---|---|---|
| 1,838,336 | Uehling | Dec. 29, 1931 |
| 2,075,869 | Sherrick et al. | Apr. 6, 1937 |
| 2,227,938 | Krebs | Jan. 7, 1941 |
| 2,480,470 | Hulbert | Aug. 30, 1949 |

FOREIGN PATENTS

| | | |
|---|---|---|
| 242,278 | Great Britain | Mar. 25, 1926 |